United States Patent
Huberman et al.

(10) Patent No.: US 10,425,773 B1
(45) Date of Patent: Sep. 24, 2019

(54) METHOD AND SYSTEM OF CROWD-SOURCED HEADING CORRECTIONS

(71) Applicant: MAPSTED CORP., Misissauga OT (CA)

(72) Inventors: Sean Huberman, Guelph (CA); Ahmad Saud Manzar, Fonthill (CA)

(73) Assignee: MAPSTED CORP., Mississaugia, Ontario (CA)

( * ) Notice: Subject to any disclaimer, the term of this patent is extended or adjusted under 35 U.S.C. 154(b) by 0 days.

(21) Appl. No.: 16/359,049

(22) Filed: Mar. 20, 2019

(51) Int. Cl.
| | |
|---|---|
| *H04W 4/029* | (2018.01) |
| *H04W 4/02* | (2018.01) |
| *H04W 4/024* | (2018.01) |
| *G01C 21/20* | (2006.01) |
| *G01S 5/02* | (2010.01) |
| *H04W 4/33* | (2018.01) |
| *H04W 4/80* | (2018.01) |

(52) U.S. Cl.
CPC .......... *H04W 4/029* (2018.02); *G01C 21/206* (2013.01); *G01S 5/0257* (2013.01); *H04W 4/024* (2018.02); *H04W 4/026* (2013.01); *H04W 4/33* (2018.02); *H04W 4/80* (2018.02)

(58) Field of Classification Search
CPC ....... H04W 4/029; H04W 4/024; H04W 4/33; H04W 4/026; H04W 4/80; G01C 21/206; G01S 5/0257
See application file for complete search history.

(56) References Cited

U.S. PATENT DOCUMENTS

| | | | |
|---|---|---|---|
| 10,145,962 B1 * | 12/2018 | Nikkhah | G01S 19/46 |
| 2010/0332125 A1 * | 12/2010 | Tan | G01C 21/165 |
| | | | 701/408 |
| 2019/0107396 A1 * | 4/2019 | Tan | G01C 21/005 |

* cited by examiner

*Primary Examiner* — Dinh Nguyen
(74) *Attorney, Agent, or Firm* — Henry L. Bhab

(57) ABSTRACT

A method and system of updating a direction of traversal of a mobile device. The method comprises determining that a first and a second mobile device are traversing an indoor route in a same heading based on a first and second heading angles determined at the first and the second mobile devices respectively, the first and second heading angles having an associated first and a second confidence levels respectively, receiving a broadcast, from the second mobile device, of a localization data packet that includes data of the second heading angle and the associated second confidence level, and if the first confidence level determined at the first mobile device is lower than the second confidence level determined at the second mobile device, updating the first heading angle of the first mobile device in accordance with the second heading angle of the second mobile device.

20 Claims, 4 Drawing Sheets

METHOD AND SYSTEM OF CROWD-SOURCED HEADING CORRECTIONS

TECHNICAL FIELD

The disclosure herein relates to the field of mobile device indoor navigation and localization.

BACKGROUND

Users of mobile devices are increasingly using and depending upon indoor positioning and navigation applications and features. Seamless, accurate and dependable indoor positioning of a mobile device carried or worn by a user can be difficult to achieve using satellite-based navigation systems when the latter becomes unavailable, or only sporadically available and therefore unreliable, such as within enclosed, or partially enclosed, urban infrastructure and buildings, including hospitals, shopping malls, airports, university campuses and industrial warehouses. Pedestrian navigation or positioning solutions may rely on sensors including accelerometers, gyroscopes, and magnetometers that may be commonly included in mobile phones and other mobile computing devices, in conjunction with acquired wireless communication signal data and magnetic field data to localize a pedestrian user in possession of such a mobile device.

DETAILED DESCRIPTION

Figure 1:
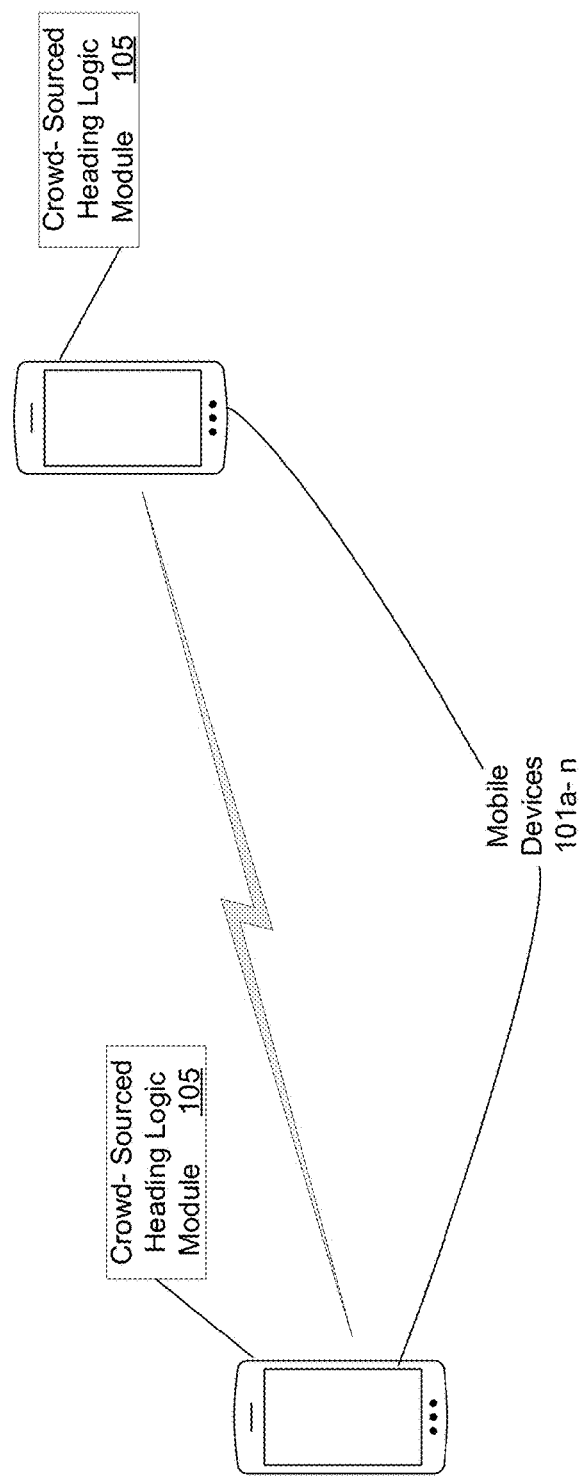
FIG. 1 illustrates, in an example embodiment, a crowd-sourced system for localization of a mobile device.

Among other benefits and technical effect, embodiments provided herein allow one or more mobile devices that can be localized with a high degree of accuracy to broadcast, via a wireless radio frequency (RF) signal, their estimated positions to peer mobile devices within a given pedestrian area. When peer mobile devices are generally in a known proximate range and embarked on a same or similar directional heading, a given mobile device may receive a broadcast from at least a second mobile device in the set of peer mobile devices within the pedestrian area. The broadcast may include a localization data packet broadcast by mobile device that includes its autonomous heading data, upon which the receiving mobile device may adopt or copy the heading information of the broadcasting peer mobile device traversing in a common or same direction along the indoor area, in order to establish its own heading direction or angle. In one embodiment, a given mobile device may adopt the heading of a peer device when advantageous for localization purposes to do so under certain conditions, for example, when encountering an unusually strong and distortive local magnetic field during traversal. During such a prevailing magnetic field, autonomous inertial data of the adopting mobile device may be less reliable, resulting in skewed or distorted heading calculations. More specifically, in such a crowd sourcing-based approach, users provided with, or carrying, an indoor positioning mobile device, may broadcast their known positions to other mobile devices within the crowd of peer mobile devices.

A method of updating a direction of traversal of a mobile device comprises determining that a first and a second mobile device are traversing an indoor route in a same heading based on a first and second heading angles determined at the first and the second mobile devices respectively, the first and second heading angles associated with a first and a second confidence levels respectively, receiving a broadcast, from the second mobile device, of a localization data packet that includes data of the second heading angle and the associated second confidence level, and if the first confidence level determined at the first mobile device is lower than the second confidence level determined at the second mobile device, updating the first heading angle of the first mobile device in accordance with the second heading angle of the second mobile device.

In this manner, when a mobile device, via its sensor devices including magnetometer and gyroscope in some embodiments, detects a prevailing strong or distortive magnetic field, the confidence level associated with the data fusion and localization process is lessened in accordance with lower reliability of the acquired inertial data such as based on inertial sensors of the mobile device including gyroscope and accelerometer and compass headings. Advantageously, other peer mobile devices in proximity that are not affected or that are affected to a much lesser extent by the distorting magnetic field may broadcast their heading information to peer mobile devices traversing an indoor route. Whereupon determining that both broadcasting and receiving mobile devices are traversing in a common heading, and that the broadcasting mobile device is not affected by a distortive magnetic field that the receiving mobile device has encountered, the broadcasted heading information may be adopted by the receiving mobile device as a more accurate, or truer, representation of its own heading, at while under the influence of the distortive magnetic field.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

The indoor route or pedestrian area, in embodiments, may be an indoor area within any one of a shopping mall, a warehouse, an airport facility, a hospital facility, a university campus facility or any at least partially enclosed building. The term pedestrian as used herein is intended not encompass not only walking pedestrians, but also users of mobile phones moving at typical pedestrian speeds, for example at less than 10 miles per hour using automated means within the pedestrian area, including but not limited to automated wheelchairs or automated people-moving indoor carts.

A crowd-sourced system for updating a direction of traversal of a mobile device is also provided. The system comprises a first mobile device including a processor and a memory, the memory including instructions executable in the processor of the first mobile device to determine that the first and a second mobile device are traversing an indoor route in a same heading based on a first and second heading angles determined at the first and the second mobile devices respectively, the first and second heading angles associated with a first and a second confidence levels respectively, receive a broadcast, from the second mobile device, of a localization data packet that includes data of the second heading angle and the associated second confidence level, and if the first confidence level determined at the first mobile device is lower than the second confidence level determined at the second mobile device, update the first heading angle of the first mobile device in accordance with the second heading angle of the second mobile device.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, crowd-sourced system 100 for localization of any of mobile devices 101a-n within a pedestrian area based at least on directional heading data. Mobile devices 101a-n may be such as a cellular or smartphone, a laptop or a tablet computer, or a wearable computer device that may be operational for any one or more of telephony, data communication, and data computing. As used herein, designation as mobile device 101 may refer to any one of collective mobile devices 101a-n. As used herein, the term heading means a directional heading, including a heading angle. Mobile device 101 may include fingerprint data of a surrounding or proximate pedestrian area stored in local memory. In other variations, mobile device 101 may be connected within a computer network communication system, including the internet or other wide area network, to one or more remote server computing device(s) storing the fingerprint data of the pedestrian area, the latter being communicatively accessible to mobile device 101 for download of the fingerprint data.

A pedestrian navigation, or indoor positioning, software application downloaded and installed, or stored, in a memory of mobile device 101 may render physical layout map of a facility or building of a pedestrian area within a user interface display of mobile device 101. In one embodiment, the pedestrian navigation software application may incorporate one or more portions of processor-executable instructions manifesting crowd-sourced heading logic module 105. The terms localize, or localization, as used herein means to determine an estimated coordinate position (x, y, z) along a pedestrian route or trajectory being traversed in accompaniment of mobile device 101, ideally with an indoor positioning accuracy of up to one meter or better. The display of physical layout map may further show a trajectory or pedestrian route traversed by a user in possession of mobile device 101 within the pedestrian area.

Mobile device 101 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices, and measuring a received signal strength, and of determining signal connectivity parameters, related to the ambient wireless signals. In particular, mobile device 101 may include location determination capability such as by way of a GPS module having a GPS receiver, and a communication interface for communicatively coupling to communication network 107, including by sending and receiving cellular data over data and voice channels.

A fingerprint data repository, or any portion(s) thereof, may be stored in a remote computing server device and made communicatively accessible to mobile device 101 via a communication network. In some embodiments, it is contemplated that the fingerprint data repository, or any portions of data and processor-executable instructions constituting the fingerprint data repository, may be downloaded for storage, at least temporarily, within a memory of mobile device 101. In embodiments, the fingerprint map data stored in the fingerprint data repository further associates particular positions along a pedestrian route of an indoor facility with any combination of fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in the fingerprint data repository. Fingerprint maps of a respective building or indoor facility, or any portions thereof, may be downloaded into a memory of mobile device 101 for use in conjunction with the pedestrian navigation software application executing thereon.

A particular fingerprint or signature based on any of received wireless communication signal strength and signal connectivity parameters, magnetic field parameters or barometric pressure parameters, and mobile device inertial sensor data may be detected or recorded by mobile device 101, whereupon the fingerprint or signature as detected may be matched to a reference fingerprint, or a reference pattern including a set of fingerprints, in a stored fingerprint map of a given facility made accessible to crowd-sourced heading logic module 105 to identify a unique position of mobile device 101 along a pedestrian route. As used herein, term signal connectivity, as distinguished from signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of mobile device 101 along a sequence of positions that constitute pedestrian route within, and even adjoining, the indoor facility.

Crowd-sourced heading logic module 105, constituted of logic instructions executable in a processor of mobile device 101 in one embodiment, may be hosted at mobile device 101 and provides, at least in part, capability for system localizing a mobile device along a pedestrian route traversed in an indoor area or facility. In alternate embodiments, one or more portions constituting crowd-sourced heading logic module 105 may be hosted remotely at a server device and made communicatively accessible to mobile device 101 via communication network 107.

Figure 2:
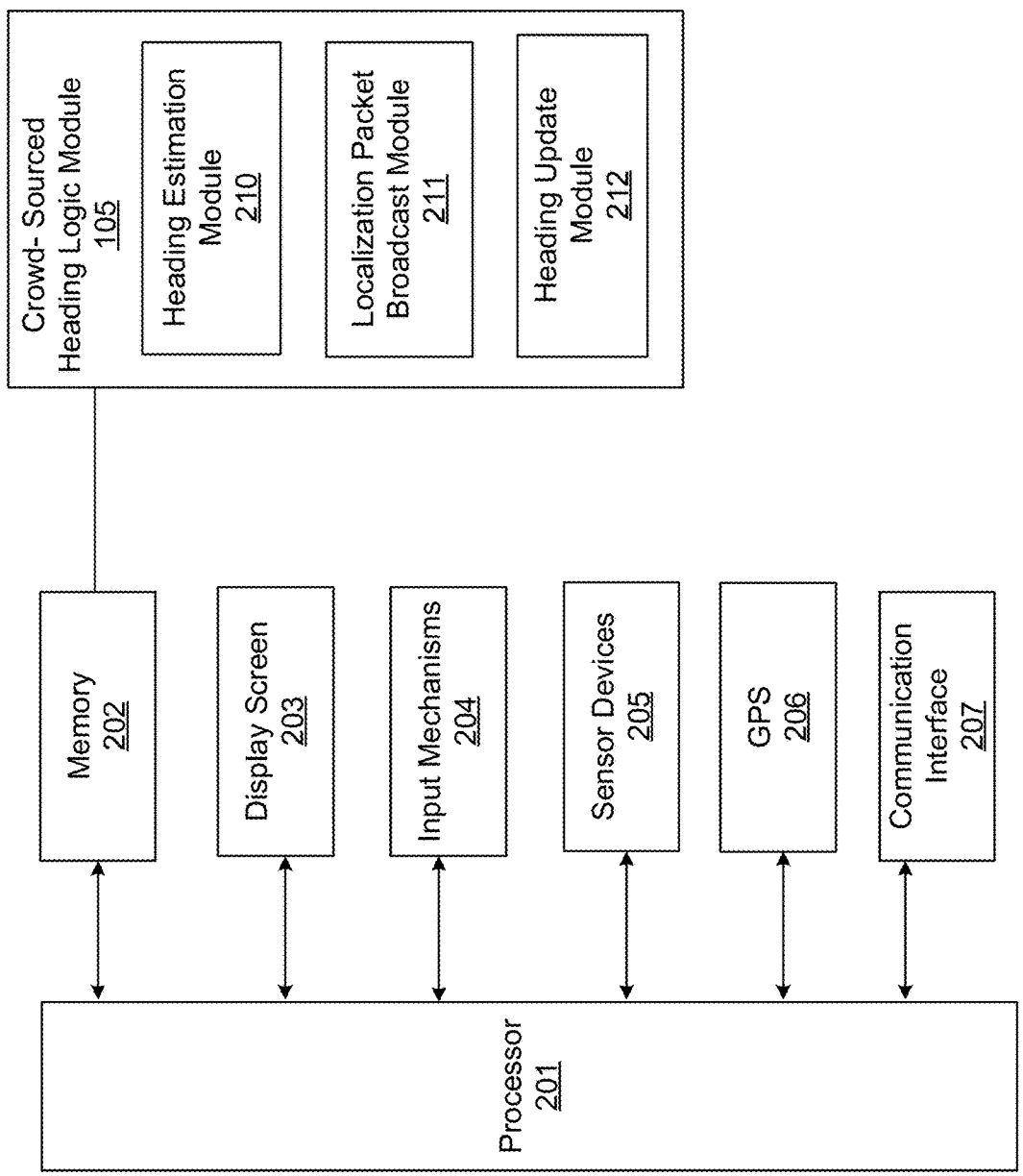
FIG. 2 illustrates, in one example embodiment, an architecture of a mobile device used in a crowd-sourced localization system.

FIG. 2 illustrates, in one example embodiment, an architecture of mobile device 101 used in crowd-sourced localization system 100 based at least on directional heading data from inertial sensors of the mobile devices 101a-n. Mobile device 101 may include processor 201, memory 202, display screen 203, input mechanisms 204 such as a keyboard or software-implemented touchscreen input functionality, barcode, QR code or other symbol- or code-scanner input functionality. Memory 202 of mobile device 101 may be constituted of a random access memory, such as a dynamic or a static random access memory, in some embodiments configured or partitioned into memory portions.

Mobile device 101 may include sensor functionality by way of sensor devices 205. Sensor devices 205 may include inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile devices 101a-n may also include capability for both transmitting and detecting, ambient wireless communication signals including but not limited to any of Bluetooth and Bluetooth Low Energy (BLE), Wi-Fi, RFID, and also satellite-based navigations signals such as, but not limited to, global positioning system (GPS) signals. For example, a BLE signal packet may typically include identifiers that are advertised publicly, whereby any other mobile device that can detect the BLE signals as transmitted or broadcast will be able to capture these identifiers. Mobile device 101 may, in this manner, be equipped with, and include capability for detecting, via sensor devices 205, and measuring a received signal strength, and for determining signal connectivity parameters, related to the ambient wireless radio frequency (RF) signals.

Mobile device 101 may also include location or position determination capability such as by way of GPS module 206 having a GPS receiver, and communication interface 207 for communicatively coupling to communication network 107, including by sending and receiving cellular and other RF data over data and voice channels.

Crowd-sourced heading logic module 105 of mobile device 101 includes instructions stored in memory 202 of mobile device 101, executable in processor 201. Crowd-sourced heading logic module 105 may comprise sub-modules, or portions thereof, including heading estimation module 210, localization packet broadcast module 211 and heading update module 212. In alternate embodiments, it is contemplated that any one or more, or portions, of sub-modules including heading estimation module 210, localization packet broadcast module 211 and heading update module 212 may be located at a remote server device communicatively accessible to mobile device 101 via network communication interface 207.

Processor 201 uses executable instructions of heading estimation module 210 to determine that a first and a second mobile device are traversing an indoor route in a same heading based on a first and second heading angles determined at the first and the second mobile devices respectively. The first and second heading angles may have an associated first and second confidence levels respectively, as determined within the pedestrian area.

Processor 201 uses executable instructions stored in localization packet broadcast module 211 to receive a broadcast, transmitted from the second mobile device, of a localization data packet that includes data of the second heading angle and the associated second confidence level. The broadcasting may be, in one example, a Bluetooth Low Energy (BLE) broadcast data packet, having a broadcast power measured in dBM (Decibel-milliwatts) wherein depending on strength of the broadcast power level, the further the BLE signal is broadcast.

Processor 201 uses executable instructions stored in heading update module 212 to, if the first confidence level determined at the first mobile device is lower than the second confidence level determined at the second mobile device, update the first heading angle of the first mobile device in accordance with the second heading angle of the second mobile device. Since the accuracy associated with estimating the position, or location, of a mobile device 101 as a consequence of localization is not absolute, but rather is subject to the statistical, or probabilistic, nature of the fingerprint parameters, including but not limited to the inherently probabilistic nature of inertial sensor data as acquired and wireless radio frequency signal parameters as received.

In additional variations, at least a second mobile device in the set of peer mobile devices 101*a-n* within the pedestrian area receives the localization data packet broadcast by mobile device 101, and may adopt or copy the heading information of a peer mobile device traversing in a common or same direction along the indoor area, in order to establish its own heading direction or angle. In one embodiment, a given mobile device may adopt the heading of a peer device when advantageous for localization purposes to do so under certain conditions, for example, when encountering an unusually strong and distortive local magnetic field during traversal. During such a prevailing magnetic field, autonomous inertial data of the adopting mobile device may be less reliable, resulting in skewed or distorted heading calculations.

Methodology

Figure 3:
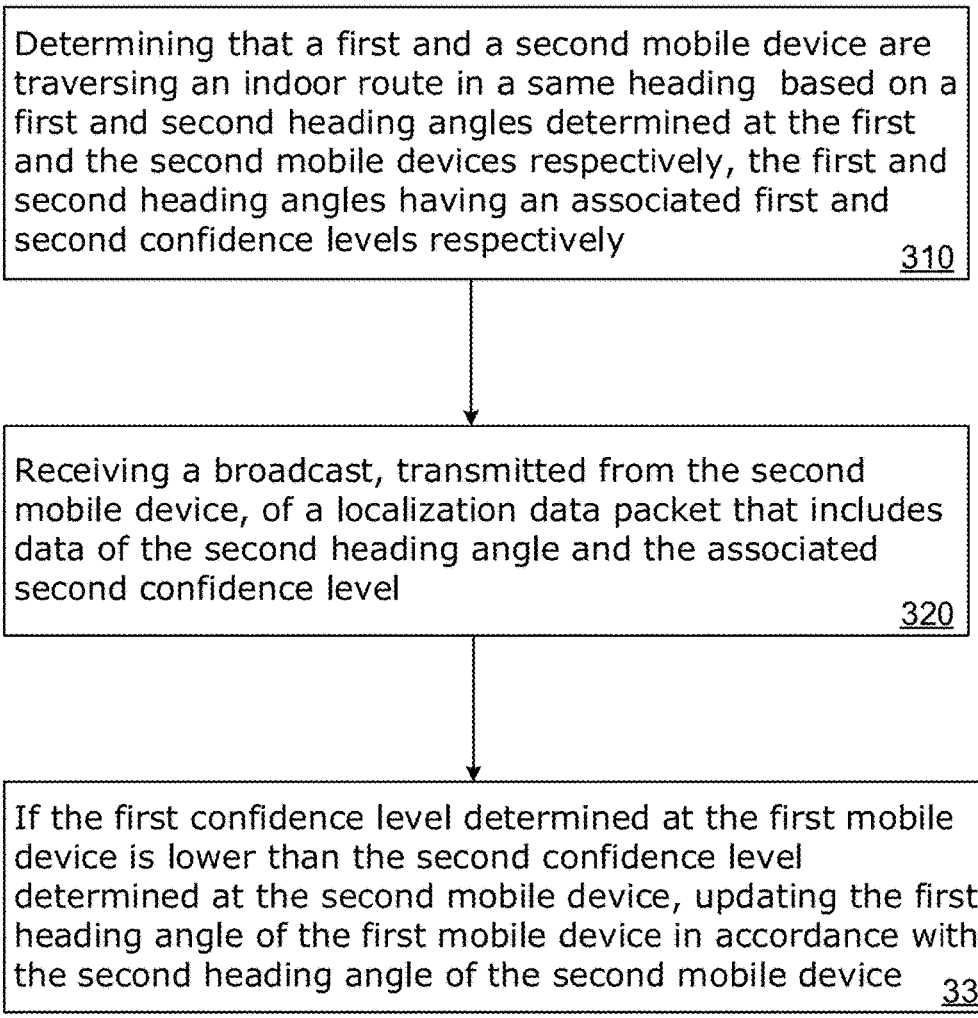
FIG. 3 illustrates an example embodiment of a method of localizing a mobile device in a crowd-sourced localization system.

FIG. 3 illustrates an example embodiment of method 300 of localizing mobile device 101 within crowd-sourced localization system 100 based at least on directional heading data. In describing examples of FIG. 3, reference is made to the examples of FIGS. 1-2 for purposes of illustrating suitable components or elements for performing a step or sub-step being described.

Examples of method steps described herein relate to the use of mobile device 101 for implementing the techniques described. According to one embodiment, the techniques are performed by crowd-sourced heading logic module 105 of mobile device 101 in response to the processor 201 executing one or more sequences of software logic instructions that constitute crowd-sourced heading logic module 105. In embodiments, crowd-sourced heading logic module 105 may include the one or more sequences of instructions within sub-modules including heading estimation module 210, localization packet broadcast module 211 and heading update module 212. Such instructions may be read into memory 202 from machine-readable medium, such as memory storage devices, or downloaded into memory 202 via network communication interface 207. In executing the sequences of instructions of heading estimation module 210, localization packet broadcast module 211 and heading update module 212 of crowd-sourced heading logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between mobile device 101 and a remote but communicatively accessible server computing device.

At step 310, processor 201 executes instructions included in heading estimation module 210 to determine that a first and a second mobile devices are traversing an indoor route in a same heading based on a first and second heading angles determined at the first and the second mobile devices respectively, the first and second heading angles having an associated first and second confidence levels respectively.

In one embodiment, the determination that at least two of mobile devices 102*a-n* are traversing in a same heading, or in a same direction, if the headings of each respective mobile device, based at least in part on their inertial and magnetic sensors, coincide for at least a pre-defined window of time duration. For instance, in an embodiment example, if the headings have coincided for at least a period of 5 seconds of the respective traversal trajectories of the at least two mobile devices, though it is contemplated that other threshold durations or periods may be used. In another embodiment, the headings, or directions, may be considered the same if the heading angles of each mobile device coincide within a 5-degrees or less range of heading angles, though it is contemplated that other threshold heading angle amounts, for example less than a 10-degrees range, may be used.

As would be appreciated by those of skill in the art, any localization, or location determination of mobile device 101 that is based, even at least partly, on fingerprint data constituted of inertial data including heading directions or angles based on gyroscope and accelerometer sensor devices, radio frequency (RF) signal parameters as broadcast, cannot be determined with absolute certainty. The accuracy associated with estimating the position or location of mobile device 101 as a consequence of localization is not absolute, but rather is subject to inherent statistical, or probabilistic, nature of the fingerprint parameters such as inertial data including heading angles, magnetic data and wireless radio frequency signal parameters as received. In some embodiments, a degree of accuracy associated with the heading angle during traversal by mobile device 101 along an indoor route may be indicated by a confidence level that is determined for, and assigned in conjunction with, a particular heading angle. As a measure of the accuracy of localization of mobile device 101 based at least in part on a heading angle as determined, the confidence level associated with the location estimate may be obtained by fusing the probabilistic results of multiple concurrent location estimates. In some embodiments, the variance in the x and y components, with respect to their mean values ($\mu_x$, $\mu_y$), can be estimated independently as:

$$\sigma_x^2 = 1/N - 1\Sigma(x-\mu_x)^2$$

$$\sigma_y^2 = 1/n - 1\Sigma(y-\mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread of confidence can be assigned on a per-group basis. If the per-group probability or confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus, the estimated position based on a data fusion of inputs including, but not limited to, any combination of inertial data, barometric data and wireless signal data, comprises a probabilistic estimate expressed as a confidence level.

At step 320, processor 201 executes instructions included in localization packet broadcast module 211 to receive a broadcast, transmitted from the second mobile device, of a localization data packet that includes data of the second heading angle and the associated second confidence level.

In one embodiment, the localization data packet 300 as broadcast amongst mobile devices 101a-n in crowd-sourced localization system 100 includes location (x, y) coordinate information and also floor number information of mobile device 101, such as for a multi-floor building constituting the pedestrian area. The localization data packet may further be partitioned to include a preamble component, for example, a company identifier or other identifier associated with either a proprietary or a standard formatting of the localization data packet, based upon which, for example, the information encoded in localization data packet may be correctly decoded into specific (x, y, z) coordinates to establish a position of mobile device 101 as localized within the pedestrian area and a confidence level estimate associated with calculation or determination of the localization coordinates.

Figure 4:
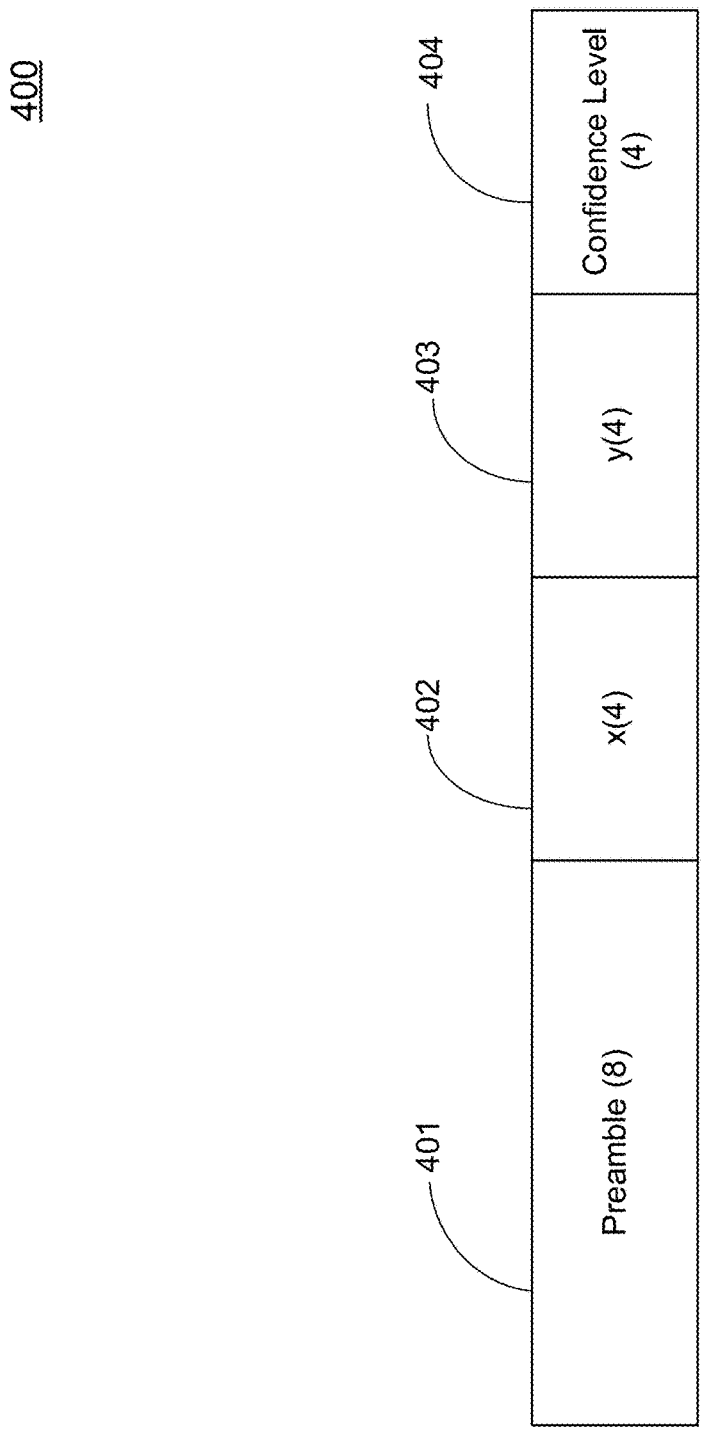
FIG. 4 illustrates, in one embodiment, a localization data packet.

With regard now to the particular embodiment as illustrated in FIG. 4, localization data packet 400 may be constituted with a total of 20 bytes of information, of which preamble component 401 may be constituted of 8 bytes, and x-coordinate 402, y-coordinate 403 and associated confidence level estimate 404 each constituted of 4 bytes. The received location information can be utilized to infer the direction of travel of nearby mobile devices. In another embodiment, localization data packet 400 may include components representing the mobile device's heading estimation and/or confidence level. In a further variation, the localization data packet is broadcast from any of mobile devices 101a-n via a BLE advertising mode, with broadcast power levels ranging from −100 to +20 Decibel-milliwatts (dBm), representing the BLE signal strength.

At step 330, processor 201 executes instructions included in heading update module 212 to, if the first confidence level determined at the first mobile device is lower than the second confidence level determined at the second mobile device, update the first heading angle of the first mobile device in accordance with the second heading angle of the second mobile device.

In one embodiment, determining that the first confidence level is lower than the second may be based on a threshold confidence level difference. For example, the second confidence level may be determined as greater than the first only if it exceeds the first confidence level by a margin of 10 percent or more, although other percentage values of such margin may be used.

Generally, in context of one or more mobile devices 101a-n collectively broadcasting and receiving broadcast BLE signals that include inertial sensor-based heading data, as the variability in the inertial sensor data acquired in the pedestrian area decreases, referred to herein as a tighter or narrower normal distribution of signal parameters, the confidence level associated with the accuracy of estimated position or localization of mobile device 101 increases.

In some embodiments, a low power broadcast power levels may range from −100 to +20 Decibel-milliwatts (dBm), representing the BLE signal strength as broadcast by any of mobile devices 101a-n to others.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method of updating a direction of traversal of a mobile device, the mobile device including a processor and a memory, the method executed in the processor and comprising:
   determining that a first and a second mobile device are traversing an indoor route in a same heading based on a first and second heading angles determined at the first and the second mobile devices respectively, the first and second heading angles having an associated first and second confidence levels respectively;
   receiving a broadcast, transmitted from the second mobile device, of a localization data packet that includes data of the second heading angle and the associated second confidence level; and
   based upon the localization data packet, when the first confidence level determined at the first mobile device is lower than the second confidence level determined at the second mobile device, updating the first heading angle of the first mobile device in accordance with the second heading angle of the second mobile device.

2. The method of claim 1 wherein the traversal comprises a route along an indoor area within at least one of a shopping mall, a warehouse, an airport facility, a hospital facility, a university campus facility and an at least partially enclosed building.

3. The method of claim 1 wherein the broadcast comprises a low power wireless signal in accordance with a power level ranging from −100 to +20 Decibel-milliwatts (dBm).

4. The method of claim 3 wherein the broadcast comprises a Bluetooth Low Energy (BLE) transmission.

5. The method of claim 1 wherein the localization data packet comprises location coordinate information.

6. The method of claim 1 wherein the localization data packet is based on more than one of a magnetic field strength and direction, a received wireless communication signal strength, a wireless connectivity indication and a barometric pressure in accordance with localization fingerprint data.

7. The method of claim 6 wherein the confidence level comprises a probabilistic estimate based on a data fusion of the more than one of the magnetic field strength and direction, received wireless communication signal strength, wireless connectivity indication and barometric pressure in accordance with localization fingerprint data.

8. The method of claim 6, wherein the second confidence level as determined is at least partly based on detecting a distortive magnetic field.

9. The method of claim 8 further comprising updating the first heading angle of the first mobile device in accordance with the second heading angle of the second mobile device while the distortive magnetic field is detected as prevalent.

10. The method of claim 1 wherein the first confidence level is determined as lower than the second confidence level only if a difference between the first and second confidence levels exceeds a predetermined threshold value.

11. A crowd-sourced system for updating a direction of traversal of a mobile device, the system comprising:
a first mobile device including a processor and a memory, the memory including instructions executable in the processor of the first mobile device to:
determine that the first and a second mobile device are traversing an indoor route in a same heading based on a first and second heading angles determined at the first and the second mobile devices respectively, the first and second heading angles having an associated first and second confidence levels respectively;
receive a broadcast, from the second mobile device, of a localization data packet that includes data of the second heading angle and the associated second confidence level; and
based upon the localization data packet, when the first confidence level determined at the first mobile device is lower than the second confidence level determined at the second mobile device, update the first heading angle of the first mobile device in accordance with the second heading angle of the second mobile device.

12. The system of claim 11 wherein the traversal comprises a route along an indoor area within at least one of a shopping mall, a warehouse, an airport facility, a hospital facility, a university campus facility and an at least partially enclosed building.

13. The system of claim 11 wherein the broadcast comprises a low power wireless signal in accordance with a power level ranging from −100 to +20 Decibel-milliwatts (dBm).

14. The system of claim 13 wherein the broadcast comprises a Bluetooth Low Energy (BLE) transmission.

15. The system of claim 11 wherein the localization data packet comprises location coordinate information.

16. The system of claim 11 wherein the localization data packet is based on more than one of a magnetic field strength and direction, a received wireless communication signal strength, a wireless connectivity indication and a barometric pressure in accordance with localization fingerprint data.

17. The system of claim 16 wherein the confidence level comprises a probabilistic estimate based on a data fusion of the more than one of the magnetic field strength and direction, received wireless communication signal strength, wireless connectivity indication and barometric pressure in accordance with localization fingerprint data.

18. The system of claim 16 wherein the second confidence level as determined is at least partly based on detecting a distortive magnetic field.

19. The system of claim 18 further comprising updating the first heading angle of the first mobile device in accordance with the second heading angle of the second mobile device for as long as the distortive magnetic field is prevalent.

20. The system of claim 11 wherein the first confidence level is determined as lower than the second confidence level only if a difference between the first and second confidence levels exceeds a predetermined threshold value.

* * * * *